F. H. MILLS.
POWER TRANSMITTING MECHANISM FOR DRILLS AND THE LIKE.
APPLICATION FILED JAN. 18, 1911.
1,303,356.
Patented May 13, 1919.
5 SHEETS—SHEET 1.
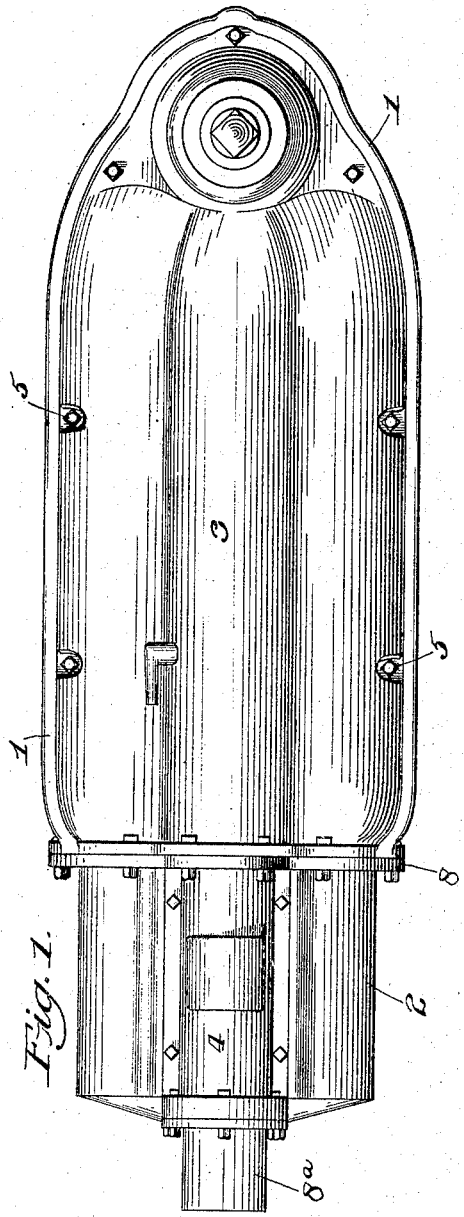
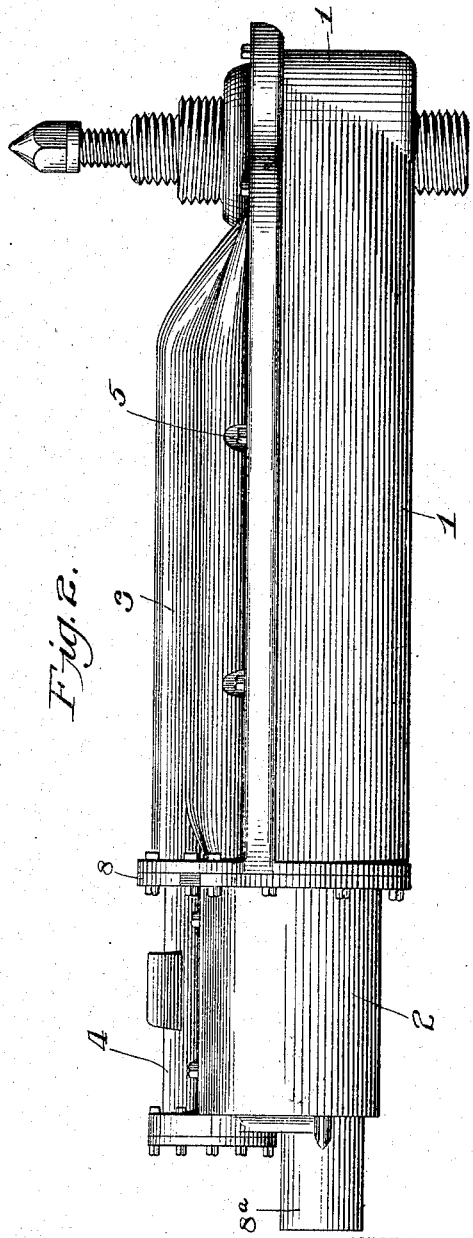
WITNESSES
INVENTOR
Frank H. Mills
BY
ATTORNEY

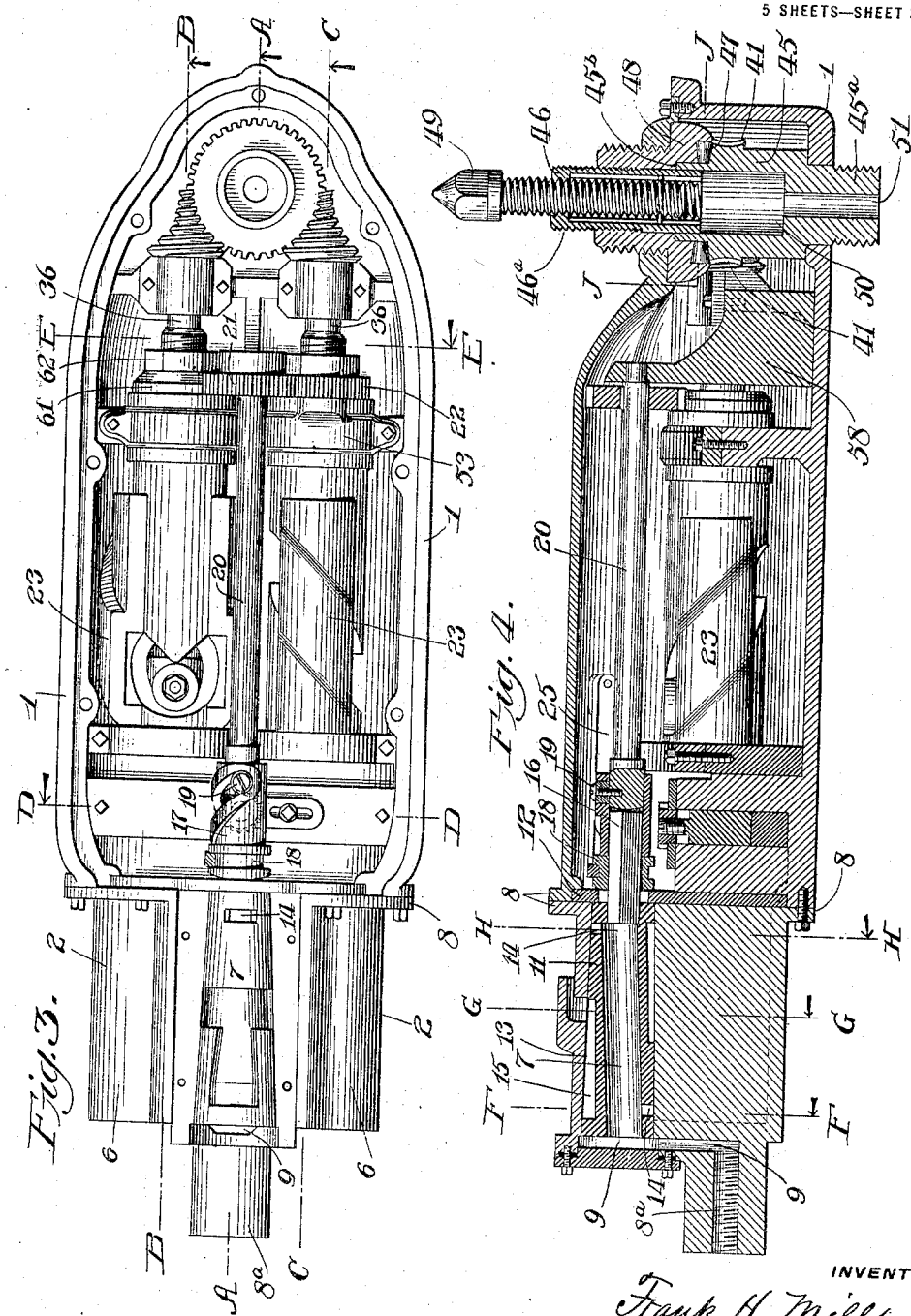

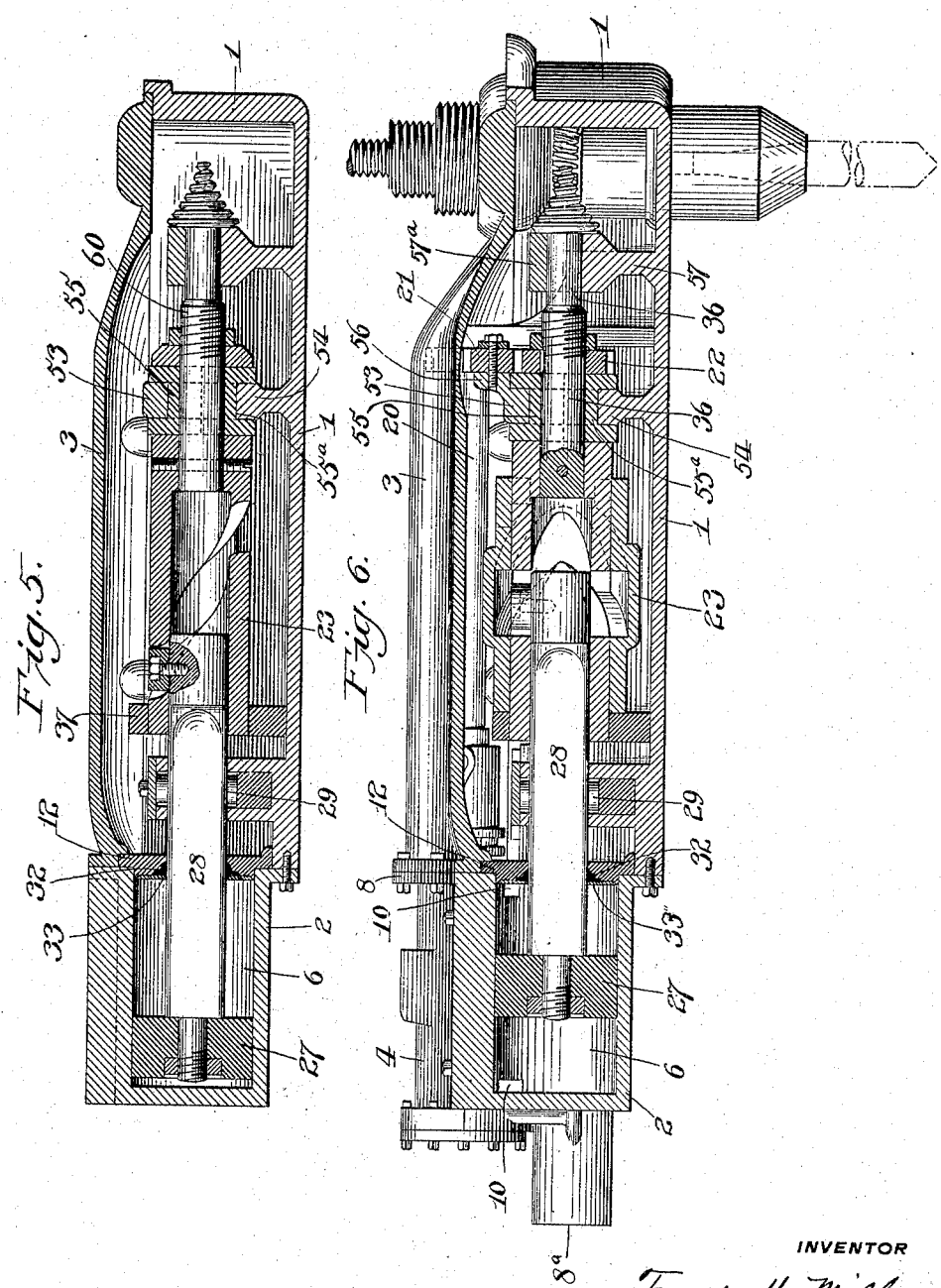

F. H. MILLS.
POWER TRANSMITTING MECHANISM FOR DRILLS AND THE LIKE.
APPLICATION FILED JAN. 18, 1911.
1,303,356.
Patented May 13, 1919.
5 SHEETS—SHEET 4.
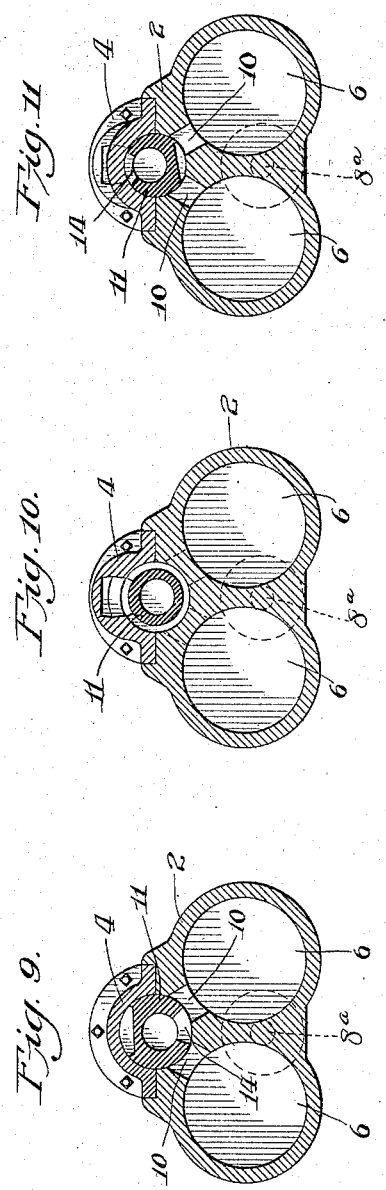
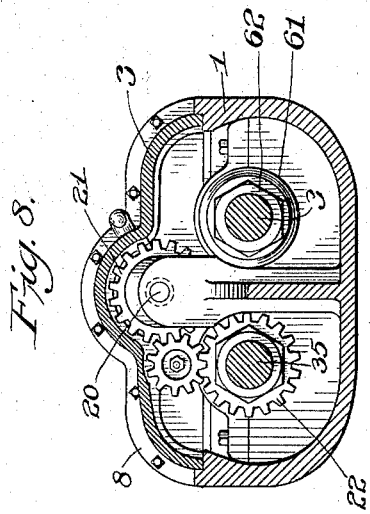
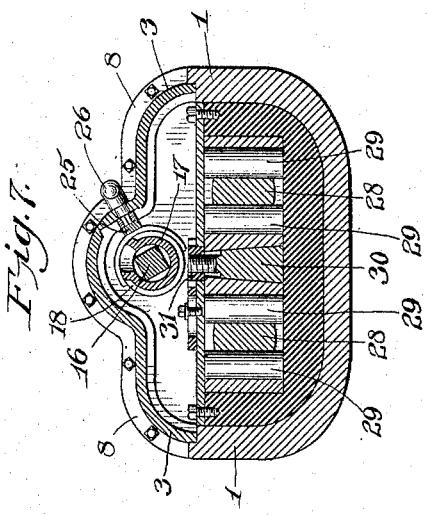
INVENTOR
Frank H. Mills
BY
H. V. Fenton
ATTORNEY
WITNESSES

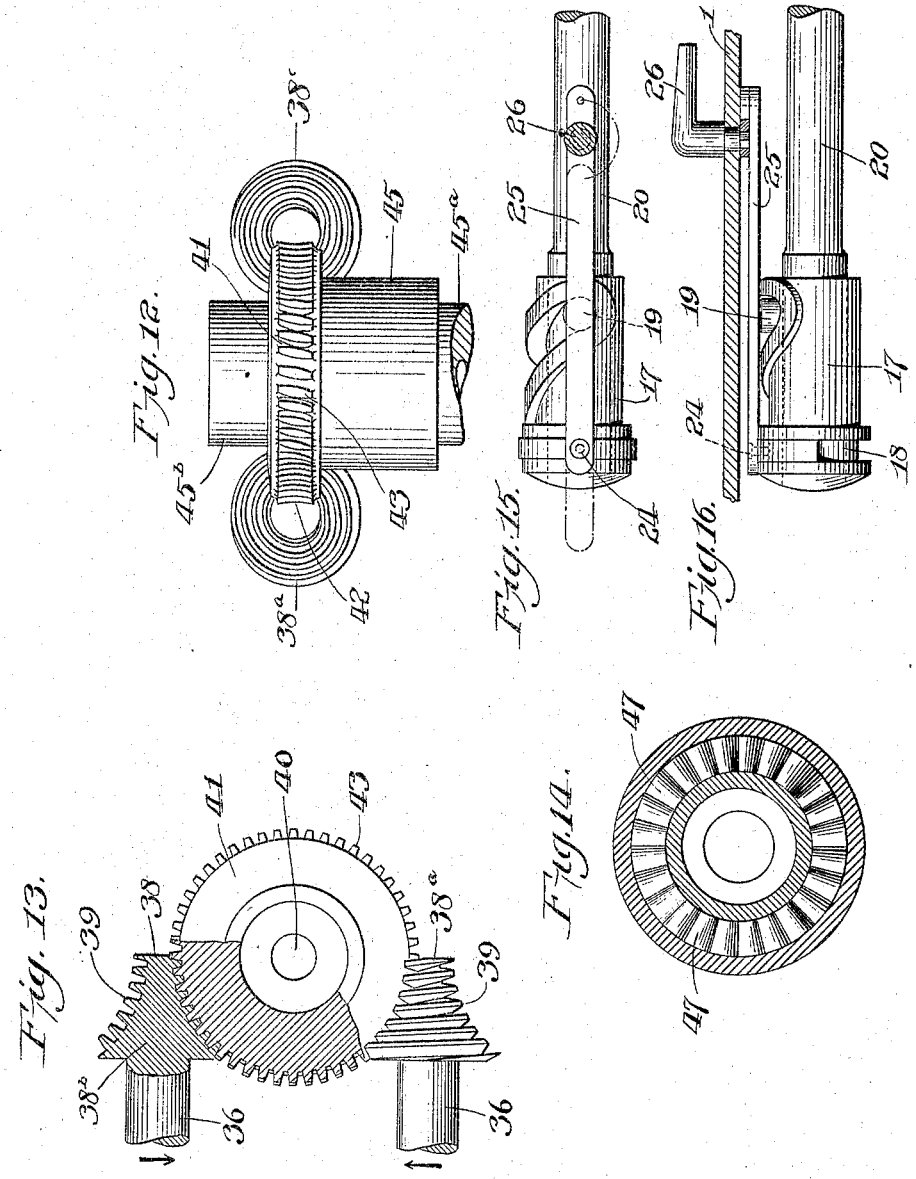

UNITED STATES PATENT OFFICE.

FRANK H. MILLS, OF CAMDEN, NEW JERSEY.

POWER-TRANSMITTING MECHANISM FOR DRILLS AND THE LIKE.

1,303,356.      Specification of Letters Patent.      Patented May 13, 1919.

Application filed January 18, 1911. Serial No. 603,218.

*To all whom it may concern:*

Be it known that I, FRANK H. MILLS, a citizen of the United States, residing in the city of Camden, State of New Jersey, have invented certain new and useful Improvements in Power-Transmitting Mechanism for Drills and the like, of which the following is a full, clear, and exact description, reference being had to the accompanying drawings, forming a part of this specification.

My invention has for its object the provision of an organized power-transmitting mechanism which is direct-acting, compact, and of great power, operated by a motor, and comprising as its characteristic features a duplex worm-gear of novel construction, actuated by a pair of rotatable shafts arranged in parallelism, the worm-wheel element of the worm-gear comprising means to directly transmit the power of the gear to a rotatable element, such as a gear wheel, a spindle or a drill. In the accompanying drawings described in the following specification, I have shown and described it as applied to and forming part of a portable power drill, for which purpose it has marked and special utility; and for that purpose I prefer to use as the motor element, a reciprocating engine, adapted to be operated by compressed air or other fluid pressure, and comprising a new mechanical movement patented to me by Letters Patent No. 893,258 dated July 14, 1908, adapted to directly convert reciprocatory into rotary motion, with reversing devices therefor.

It will be observed from the drawings and description that applied to such a use, in the manner and by the means shown, the concrete result is a portable drill having as its actuating elements a series of associated power mechanisms operating in unison and supplementing and balancing one another in the application and increase of power; that it embodies all the propelling mechanism within itself, with valve-mechanism instantly controlling its operation, and is equipped with reversing mechanism readily adapting it to tapping as well as drilling without change of parts, and is so compact in the disposition of its elements that it may be used for corner drilling where room is limited and where most pneumatic drills can not be applied; the casing being of a size and form to operatively inclose the mechanism and no more, and moreover providing a perpetual lubricating chamber for the contained propelling mechanism and gearing, thus preventing overheating from the excessive friction created by the rapid action of the parts; the casing being made sufficiently tight that oil or the usual lubricant can be sealed up therein during operation; all the chambers containing any moving parts, forward of the cylinders and their valve mechanism, being constantly immersed in oil.

In the accompanying drawings illustrating my invention as applied to a power drill, Figure 1 is a plan view of the device in its containing and operating casing, and Fig. 2 a side elevation thereof. Fig. 3 is a like plan view as Fig. 1 but with the cover of the main casing as also the cover of the rear and valve-casing, removed; and Fig. 4 a central longitudinal section thereof, on the line A—A of Fig. 3, including the casing-covers shown in Fig. 2.

Fig. 5 is a section on line B—B of Fig. 3.

Fig. 6 is a section on line C—C of Fig. 3.

Fig. 7 is a section on line D—D of Fig. 3, looking rearward.

Fig. 8 is a section on line E—E of Fig. 3, looking rearward.

Fig. 9 is a section on line F—F of Fig. 4, looking rearward.

Fig. 10 is a section on line G—G of Fig. 4, looking in same direction.

Fig. 11 is a section on line H—H of Fig. 4, looking in same direction.

Fig. 12 is a rear end elevation of the connecting spindle-driving gearing, and

Fig. 13 is a plan view thereof partly in section.

Fig. 14 is a section, looking upward, taken on line J—J of Fig. 4.

Fig. 15 is a plan view of the reversing mechanism, and

Fig. 16 is a side elevation thereof.

Referring now to said drawings: 1 and 2 indicate the connected parts of a suitable casing, of a shape adapted to compactly contain the drill actuating mechanism and connecting gearing, and 3 and 4 indicate the removable covers thereon; the casing as a whole being of such shape and character as to be readily held and manipulated by the operator. Means to detachably hold the cover and casing together, such as indicated at 5 may be suitably employed. The forward part 1 of the casing is suitably shaped to contain the connected gearing hereinafter described, between the shafts of the duplex motor and the cog-gear which directly drives the tool-holding spindle; while the rear portion of the casing 1 is adapted to contain the motor cylinders, and the supplemental casing 2 to contain the valve-mechanism. These several features, in the preferred form and character of the casing, are sufficiently, indeed clearly, indicated in Figs. 1 and 2 of the drawings.

If now we refer to Fig. 3 which is a plan view of the casing and its contents, with the cover removed, and to Fig. 4, on the same sheet, which is a central longitudinal section thereof, the relative arrangement of the elements will be apparent; the rear portion 2 of the casing containing a pair of cylinders 6 and 6 (see Figs. 5 and 6) in horizontal parallelism, and centrally over and between them the valve mechanism and its adjunctive parts indicated generally at 7 in these Figs. 3 and 4.

The rear casing 2 is preferably made detachable from the forward casing 1, and connected thereto by a pair of coinciding flanges 8 bolted together. The rear casing 2 may inclose or may constitute in itself the pair of cylinders 6, 6, see Fig. 6; and between the flanges 8, 8, is operatively supported a removable plate 12 operating as a cylinder head for both cylinders. The rear portion of the casing 2 is provided with a bored projection 8ª, which is the means for supplying compressed air or other motive fluid to the cylinders. The bore of this projection 8ª leads to an aperture 9, which communicates with apertures 10, governed by a rotary valve 11, and leading to the cylinders. These apertures are formed in the base of a valve-chest 13, and another aperture 14 in the forward end thereof also leads to the opposite ends of the cylinders. Resting in said valve chest is operatively supported the rotary valve 11, which is hollow and provided with ports 14 at its opposite ends on opposite sides of its periphery. The exhaust is provided for by cut-away portions 15, see Fig. 4. The action of the valve, in its various positions, is shown in Figs. 9, 10 and 11. Rotary motion is imparted to the valve 11, which carries spindle 16, the latter entering a reversing sleeve 17, carrying a grooved collar 18. The sleeve 17 has a backward and forward sliding, as well as a rotary motion, at one end on the spindle 16, and at the other end on a valve rod 20, to effect which latter the sleeve is peripherally slotted in a spiral direction, so that an actuating pin 19 therein, on the end of the valve rod 20 will, on a progressive rotary motion of the latter as hereinafter stated, impart a quarter revolution to said sleeve, and in that way operate the rotary valve to appropriately admit motive force to the respective ends of the piston cylinders. The valve rod 20 has such rotary movement imparted to it by means of gears 21 meshing with gears 22 on the rear end on one of the shafts 35 (see Fig. 8) which is actuated by one of the spirally-grooved heads 23 hereinafter referred to. The reversing mechanism, which directly acts on the rotary valve 11, is shown in detached sections Figs. 15 and 16, wherein it will be seen that a pin 24 on the end of a rod 25 plays in the groove 18 of the sliding collar; while the other end is operatively connected to an actuating lever with handle 26 extending through the cover of the casing.

The pair of cylinders 6, 6, contain each a piston 27, each of which imparts a backward and forward reciprocating motion to a connected piston rod 28. These piston rods are flat and set edgewise and pass through elongated openings in the cylinder head, and thence between a pair of adjustable rolls 29, 29, (see Fig. 7) which latter are acted on by a vertically-sliding tapered wedge 30 raised or lowered by a locking nut 31. This construction operates as a guide for the piston rods, preventing all tendency to rotary or vibratory movement, and takes the place of the usual cross-head in a reciprocating engine. A further bearing plate 37 rests upon the cylindrical ends of the heads 23 to prevent any rear end vibratory movement of the heads.

In order to prevent leakage of the elongated apertures in the cylinder head 12 where the piston rods pass through, I recess the inner face of the head around the apertures, apply a packing 32 in said recess, and hold the packing in place by a thin sheet spring metal plate 33, such as thin steel or spring brass; with the result that on the outward movement of the piston the air-pressure will be against this spring plate, while on the inward movement the spring holds the packing in operative position.

Each of the pair of spiral grooved heads 23 is constructed and actuates substantially as shown in my prior U. S. Patent 893,258 dated July 14, 1908. Sufficient therefore to say that the rotary movement, as therein described, is imparted thereto by the actuating pin on the head of the flat reciprocating piston rod. One head 23 is always a quarter revolution in advance of the other. The outer end of the hollow head 23 has secured fixedly to it, a shaft 36 which therefore has like rotary movement.

The shaft 36 is supported in a pair of divided bearings 53 (see Fig. 3) and 54 (see Figs. 5 and 6) and between them a divided box 55 and 55ª. The upper half of divided bearing 53 is supplied with a boss 56 (see Fig. 6) operating as a bearing for shaft of gear 21.

Fixedly mounted within the casing 1 is a bracket-bearing 57, with a curved face for shaft 36, and a removable half top 57ª similarly curved. The fixed portion 57 of this bracket bearing has a rearwardly-extending portion 58 (see Fig. 4) which serves as a bearing for end of valve rod 20.

That portion of shaft 36 rearward of the gears 21 and 22 is threaded as at 60 (Fig. 5) for the purpose of holding in place the spirally-grooved heads 23 and particularly taking up the end thrust, and a collar 61 (see Fig. 8) on said threaded portion of shaft 60 fixes the parts in any position of adjustment as to wear or longitudinal thrust, and a nut 62 holds the collar.

On the extreme end of each of the shafts 36, is an integrally-constructed worm screw, best shown at 38 and 38ª respectively, in Fig. 13.

As the pair of shafts 36 rotate toward each other, as shown in the drawings, these screws 38 and 38ª also so rotate with respect to each other. The body portion 38ᵇ of these screws is tapered from its base outward; the annular periphery of the tapered body is concaved; and the face of the concavity is provided with a spiral thread 39 of progressively varying diameter or width in its series of convolutions. The convolutions of the spiral thread 39 being on the face of a concaved tapered periphery, necessarily are not in parallel straight planes, and the median line through each of the threads in the series would therefore have a different angle, relatively to each other, and to a straight line drawn through the longitudinal center of the body portion 38ᵇ, and yet the median line through each of the threads would pass through the axial center 40 of the connecting gear 41. The worm screws 38 and 38ª are alike in all respects, and capable of rotating the worm wheel 41 and tool holder, in either direction. The worm wheel is a flat annular ring, as indicated in Figs. 12 and 13, formed on and preferably integral with the upper end of the tool holder; and it is provided with a concave periphery the face of which has teeth 43 which are preferably thicker in the center than at their ends, as indicated in Fig. 12, for the purpose of causing them to accord with the direction of and mesh fully with the thread 39 on the concaved tapered periphery of the worm screws 38 and 38ª. The result of this construction, of each of said elements, is to provide a short worm screw, with the power of a long worm screw of usual construction, and capable of actuating the worm wheel in either direction.

The worm wheel 41 is mounted fast on and is preferably an integral part of a tool holder for detachably holding and actuating a drilling or tapping tool, and is so shown.

The tool-holder has a portion 45ᵇ of relatively narrowed diameter, the base of which is tapered outwardly and downwardly, as also the top edge of the worm gear 41, to receive a series of tapered anti-friction rolls 47.

The portion of said head below the worm-gear 41, and indicated at 45 has a reduced threaded portion 45ª, and thereby rests within an aperture in the basal wall of the casing 1. Within an upper guide-head 48 mounted over the tool-holder head, and which is bored out, is fitted a telescopically-constructed feed-screw consisting of said screw 49 fitted in a sleeve 46 the latter having a shoulder 46ª to limit the up-movement of the feed-screw 49, while said sleeve 46 itself is limited in up-movement by contact with an annular stop 45ᵇ on the inner face of the bore of the bearing-guide head 48. The result is that on turning feed-screw 49, the sleeve 46 is not moved upward until the screw 49 is brought to a stop by shoulder 46ª, and thereafter sleeve 46 will be given an up-movement to withdraw it from hollow portion X of head 45, until likewise brought into contact with the aforesaid stop in the guiding head, and on downward movement by contact with base 50 of said head 45. Said part 45 has a projecting and externally-threaded portion 45ª, the latter to hold the removable tool-holder, the bore 51 therein being to allow removal of the tool without removing its holder. The tool and its holder are indicated at 52, in Fig. 6, in position.

The operation of the device as a whole may be briefly stated, as follows: Motive fluid being supplied to the cylinders, through the rotary valve, the pistons reciprocate in accordance with the setting of the spirally-grooved heads 23, which as before mentioned, are set on the quarter-turn, so that one is always a quarter-revolution ahead of the other, and both impart a rotary motion to their shafts 36 which carry the gears 38 and 38ª, which in turn impart a rotary motion to the tool-holding head through the gear 41 thereon. The actuating cylinder pistons and spirally-grooved heads may be reversed in motion by means of the valve-reversing mechanism described, whereby the drilling tool can be given a reverse rotary motion, a most important feature in using my device for tapping purposes.

While I have shown for the purpose of exemplifying one useful application of my novel power-transmitting mechanism, a novel engine element, its valves and connecting actuating and reversing devices, the separate containing casing for the complete power drill, and novel elements constituting the drill holder, I reserve these features for divisional patent applications, hence have not separately claimed the same herein.

Having thus described my invention, I claim as new and desire to secure by Letters Patent:—

1. Power transmitting mechanism comprising in combination, a support, a rotatably driven shaft, a conical worm screw tapered from its base outward and fixedly mounted on the free end of said shaft, said worm having a longitudinally concaved periphery, the concave face of which is spirally threaded, the convolutions thereof being of relatively different angularity and also of progressively varying diameter, and a peripherally concaved worm wheel the teeth of which are thicker in the center than at their ends, operatively meshing with said worm, and provided with means adapted to impart its motion to a rotary machine element.

2. Power transmitting mechanism comprising in combination a support, a pair of shafts arranged in parallelism and adapted to be rotated continuously in either direction, a pair of oppositely disposed conical worms fixedly mounted on the ends of said shafts, said worms having a tapered and longitudinally concaved periphery with a spiral thread the convolutions whereof have a different angle relatively to each other, a worm wheel operatively interposed between the said worms and provided with an elongated end adapted to impart its motion to a rotary machine element.

3. Power transmitting mechanism comprising in combination a support, a rotatably driven shaft, a conical worm fixedly mounted on the free end thereof, said worm having a longitudinally concaved tapered periphery which is spirally threaded, the convolutions whereof have a different angle relatively to each other, and a worm wheel meshing with the threads of said worm screw and having an elongated end adapted to impart its motion to a rotary machine element.

4. Power transmitting mechanism comprising in combination a support, a pair of parallel shafts adapted to be rotated in either direction, a pair of complemental conical worms on the free ends of said shafts, the peripheries of said worms being tapered from the base outward and longitudinally concaved and spirally threaded in such manner that the convolutions thereof have a different angle relatively to each other; a worm wheel operatively interposed between said worm screws, and provided with an elongated end adapted to directly impart its motion to a rotary machine element.

5. Power transmitting mechanism comprising in combination a support, a pair of parallel shafts adapted to be rotated in unison, in either direction, a pair of complemental conical worms on the free ends of said shafts, the peripheries of said worms being tapered and concaved from the base outward and provided with a spiral thread the several convolutions of which are of progressively varying diameter, an interposed worm wheel having teeth longitudinally concaved, meshing with the thread of each of said worms, and provided with means adapted to directly impart its motion to a rotary machine element.

6. Power transmitting mechanism comprising in combination a support, a pair of parallel shafts, adapted to be rotated continuously and in either direction, but in unison, means to reverse the direction of rotation of said shafts, a pair of complemental conical worms on the free ends of said shafts, the peripheries of said worms being tapered and concaved from the base outward and provided with a spiral thread the convolutions of which are of progressively varying diameters, an interposed worm wheel having teeth adapted to be operatively engaged by said worms, and provided with an elongated end adapted to impart its motion directly to a rotary machine element.

In testimony whereof, I have hereunto affixed my signature this thirty-first day of December A. D. 1910.

FRANK H. MILLS.

Witnesses:
A. M. BIDDLE,
R. A. DUNLAP.